April 23, 1963
C. R. BARKLEY
3,086,824
ANTIFRICTION BEARING CONSTRUCTION HAVING
ORBITING BALL ARRANGEMENT
Filed July 8, 1959
3 Sheets-Sheet 1
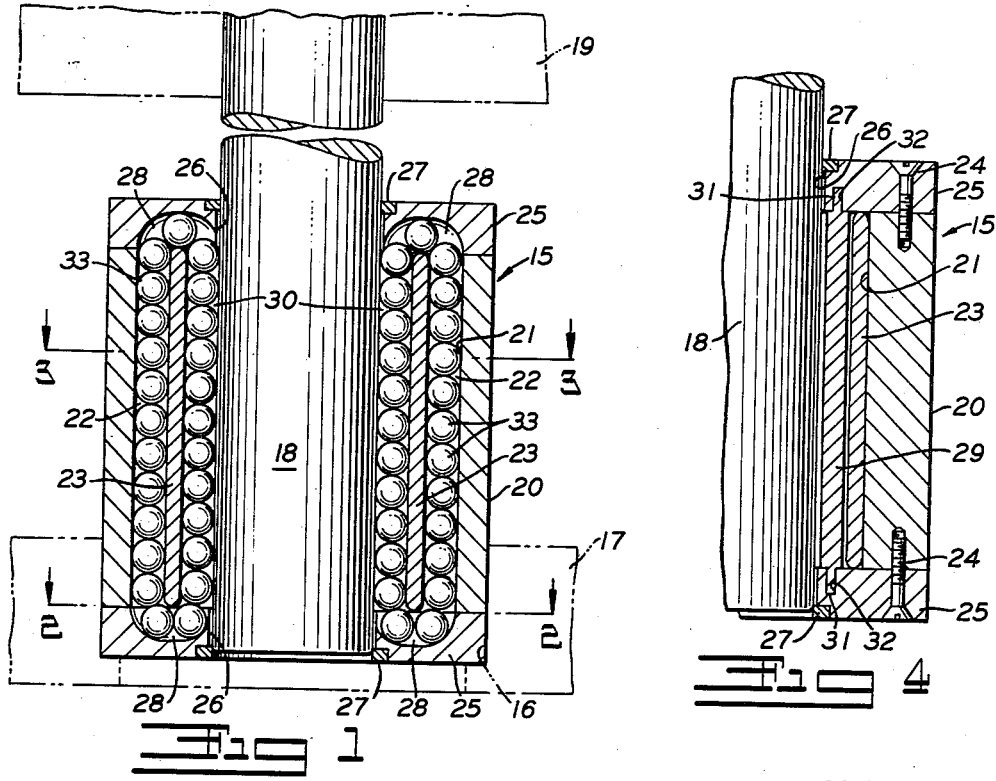
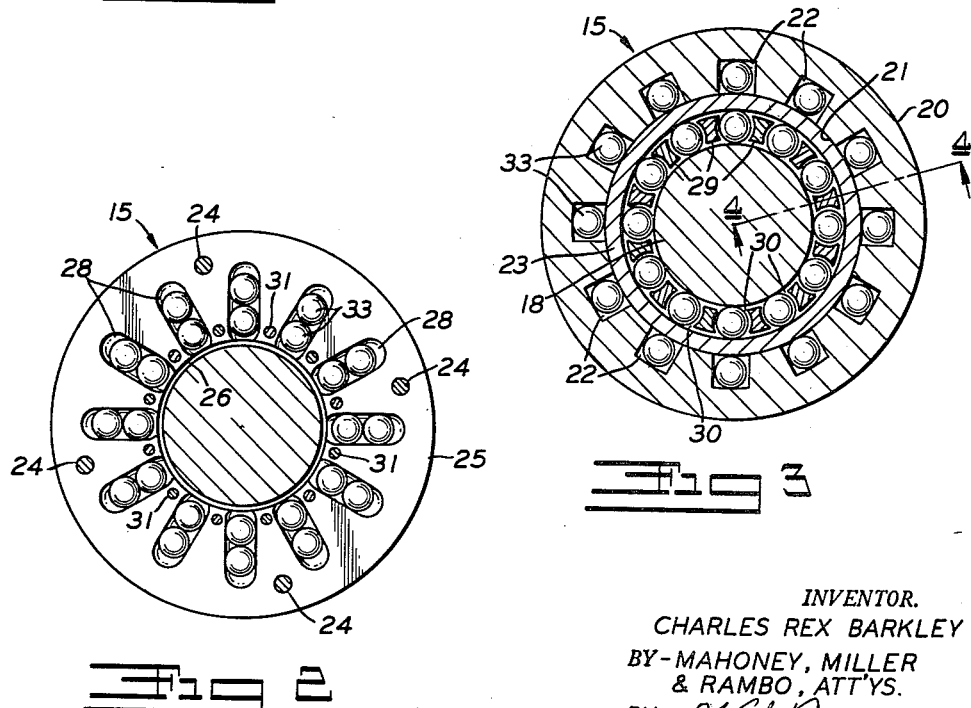
INVENTOR.
CHARLES REX BARKLEY
BY- MAHONEY, MILLER
& RAMBO, ATT'YS.
BY- *W.S. Rambo*
ATTORNEYS.

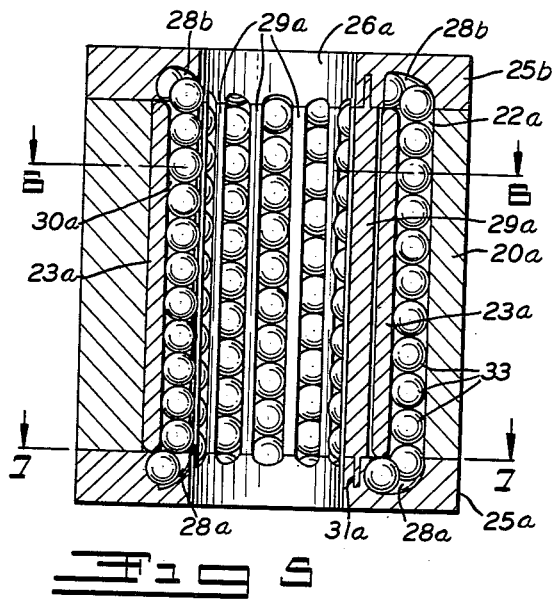

April 23, 1963 C. R. BARKLEY 3,086,824
ANTIFRICTION BEARING CONSTRUCTION HAVING
ORBITING BALL ARRANGEMENT
Filed July 8, 1959 3 Sheets-Sheet 3

INVENTOR.
CHARLES REX BARKLEY
BY- MAHONEY, MILLER
& RAMBO, ATT'YS.
BY-
ATTORNEYS.

United States Patent Office 3,086,824
Patented Apr. 23, 1963

3,086,824
ANTIFRICTION BEARING CONSTRUCTION HAVING ORBITING BALL ARRANGEMENT
Charles Rex Barkley, New Lexington, Ohio, assignor to Lempco Products, Inc., Bedford, Ohio, a corporation of Ohio
Filed July 8, 1959, Ser. No. 825,770
5 Claims. (Cl. 308—6)

The present invention relates to tubular-type antifriction ball bearing assemblies, and more specifically to an improved tubular-type bearing assembly having multiple sets of balls adapted to orbit or circulate within the bearing between relatively active and inactive positions, and having particular utility in the antifriction support of axially movable, or linearly reciprocating members, such as the guide posts of die sets or the like.

In the past, various forms and constructions of antifriction bearings having circular or oval-shaped ball-containing raceways have been proposed and actually used, but by and large, prior art bearings of the so-called recirculating ball types have been characterized by their relative complexity of construction, high cost, and/or their mechanical inability to withstand normal wear over a reasonably expected period of usage.

Accordingly, it is the primary object of the present invention to provide an improved type and construction of tubular, recirculating ball bearing assembly which is characterized by its relative simplicity of construction and its mechanical efficiency in resisting detrimental wear over sustained periods of usage.

Another object of the present invention is to provide an improved tubular, recirculating ball-type of bearing in which the so-called active ball elements, which engage an associated axially movable member, such as a die set post or reciprocating shaft, are preloaded, or maintained under compressive forces between the relatively axially movable member supported by the bearing and the relatively stationary wall structure of the bearing casing, to thereby insure extreme accuracy of movement on the part of the axially movable member, with a minimum of bearing friction, and a total prevention of any lateral or radial displacement of the axially movable member.

It is a further object of this invention to provide a bearing of the foregoing character which comprises a tubular sleeve or bushing assembly provided with two, radially spaced sets of ball-receiving raceways, each of which is substantially filled with antifriction ball elements, and including opposite, annular end cap members formed with cross-over grooves or passages adapted for the transfer of antifriction ball elements from one set of raceways to the other during movement of an associated axially movable member, whereby to provide for a continuous recirculation of ball elements between the innermost or active raceways and the outer or inactive raceways, thereby distributing normal wear-producing forces exerted upon the ball elements over a substantially greater number of ball elements than has heretofore been possible.

Still another object of the present invention is to provide a tubular antifriction bearing assembly of this character which comprises a generally tubular sleeve or bushing member formed with an axially extending open ended passage for the guided reception and movable support of an associated axially movable shaft or the like, and wherein the sleeve or bushing member is formed to provide a multiplicity of relatively closely circumferentially spaced, axially extending raceways disposed closely adjacent to an opening radially inwardly toward the axially movable member and substantially filled with spherical ball elements having segments of each ball element projecting radially inwardly for rolling engagement with the outer surface of the axially movable shaft, and a second set of axially extending, parallel raceways disposed radially outwardly from the first set of raceways and substantially filled with ball elements, in combination with opposite end caps which are arranged to close the opposite ends of the raceways, and which are formed with cross-over grooves or passages permitting of the transfer or circulation of ball elements between the inner and outer sets of raceways.

Yet, a further object of this invention is to provide a tubular antifriction bearing assembly which includes an outer sleeve-like casing having inner and outer sets of ball-receiving raceways disposed in radially spaced and circumferentially staggered order within the casing, and opposite end cap members having cross-over grooves or passages so arranged so as to effect a circumferential orbiting or circulation of balls within the casing during linear or axial movement of an associated shaft or member supported by the bearing.

For a further and more detailed understanding of the present invention and the various additional objects and advantages thereof, reference is made to the following description and the accompanying drawings, wherein:

FIG. 1 is a medial, longitudinal vertical sectional view taken through a tubular-type recirculating ball bearing assembly formed in accordance with the present invention and showing the bearing assembly in operative relation to the components of a die set;

FIG. 2 is a horizontal sectional view taken along the line 2—2 of FIG. 1, and showing particularly the arrangement of the cross-over grooves or passages formed in the lower end cap of the bearing assembly;

FIG. 3 is a similar view taken along the line 3—3 of FIG. 1;

FIG. 4 is a fragmentary vertical sectional view taken along the line 4—4 of FIG. 3;

FIG. 5 is a vertical sectional view taken along the line 5—5 of FIG. 6 and showing a modified form of bearing assembly according to the present invention;

FIG. 8 is a top plan view of the bearing assembly disclosed in FIG. 5; and

Figure 6:
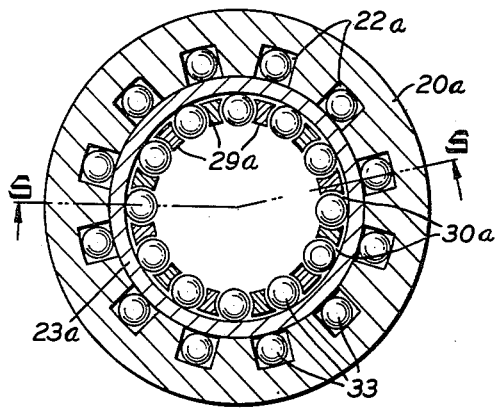
FIG. 6 is a horizontal sectional view taken along the line 6—6 of FIG. 5.
Figure 7:
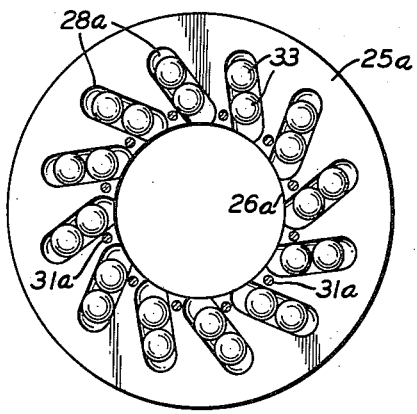
FIG. 7 is a similar view taken along the line 7—7 of FIG. 5 and illustrating the formation of the cross-over grooves or passages in the lower end cap of the bearing assembly shown in FIG. 5.

Referring now to the drawings, and particularly to the bearing assembly disclosed in FIGS. 1 through 4, inclusive, the numeral 15 designates generally a preferred form of tubular antifriction bearing assembly formed in accordance with the present invention. In FIG. 1 of the drawings, the bearing assembly 15 has been illustrated in operative relation to the components of a press-mounted die set, with the bearing assembly stationarily mounted within a socket 16 formed in the lower shoe or plate 17 of the die set. Extending axially through the central passage or bore of the bearing assembly 15 is a guide pin or post 18 which is rigidly carried in depending relation to the upper shoe or plate 19 of the die set. As will be understood by those skilled in the art, the upper and lower shoe components 17 and 19 of the die set are adapted to support, in mating registry, a pair of cooperative punch and die members, not shown, which, during reciprocation of an associated press in which the upper and lower shoes are mounted, serve to stamp or punch a workpiece inserted between the relatively engaging punch and die members.

The present bearing assembly 15 functions to guide the pin or post member 18 during axial reciprocating movement thereof in a manner to prevent any lateral or radial displacement of the pin or post 18, to thereby insure correct and exact mating engagement between the associated punch and die members supported respectively upon the upper and lower shoes or plates of the die set. While the present bearing assembly 15 has been illustrated for use in connection with die sets, it should be understood that no limitation as to usage is to be implied, as it will be obvious that the present bearing assembly may be used in the antifriction support and guidance of any linearly or axially movable member.

The bearing assembly 15 comprises an outer tubular, cylindrical sleeve-like casing 20 having an inner cylindrical wall surface 21 in which is formed, as by milling or drilling, a multiplicity of circumferentially spaced axially or longitudinally extending grooves or channels 22. The grooves or channels 22 extend straight axially through the wall structure of the sleeve-like casing 20 and open at the opposite ends thereof, and define within the outer casing 20 a first set of axially extending, parallel, ball-receiving raceways.

Positioned adjacent to the inner wall surface 21 of the casing 20 is an inner divider sleeve 23 of continuous annular cross section and of a length coextensive with the length of the outer casing 20. As will be seen by reference to FIGS. 1 and 3 of the drawings, the inner divider sleeve 23 serves to close each of the grooves or channels 22 along the inner wall surface 21 of the outer casing 20. Secured to the opposite ends of the outer sleeve-like casing 20, such as by the screws 24, are a pair of annular end caps or plates 25. As shown particularly in FIGS. 1 and 2, the end caps 25 are identical in construction, and extend radially inwardly beyond the outer casing 20 to define an axially disposed circular opening 26 at each end of the bearing assembly which permit free passage of the pin or post 18 axially through the assembly. Advantageously, the end caps 25 may be formed with an annular recessed shoulder adjacent the openings 26 in which may be secured a pair of flexible or resilient dust-excluding washers or gaskets 27 arranged for wiping contact with the outer surface of the pin or post 18. Additionally, each of the end caps 25 is formed on its inner surface with a multiplicity of arcuately curved, circumferentially spaced, radially disposed grooves or passages 28 which communicate with the ends of each of the ball-receiving grooves or channels 22, and which define a multiplicity of ball transfer or cross-over passages above and below the ends of the inner divider sleeve 23.

Arranged adjacent the inner surface of the inner divider sleeve 23, and extending between the opposite end caps 25, are a multiplicity of circumferentially spaced, axially or longitudinally extending separator segments 29 formed on the opposite sides thereof with arcuately curved, concave surfaces which define between each pair of adjacent separator segments 29 an inner axially extending ball-receiving raceway 30 which opens in an elongated slot to the axial passage of the assembly. As will be seen particularly in FIG. 4 of the drawings, each of the separator segments 29 is formed at the ends thereof with a relatively reduced size, longitudinal connector extension 31 which is adapted to be positioned and retained within cooperative locating sockets or bores 32 formed at circumferentially spaced intervals in the inner surfaces of each of the end caps 25. In this manner, the separator segments 29 are located and maintained in predetermined circumferentially spaced relationship by the end caps 25 and are prevented from displacement upon assembly of the bearing. As will be noted by reference to FIG. 3, each of the inner and outer sets of ball-receiving raceways or channels 30 and 22, respectively, are substantially filled with a multiplicity of spherical ball elements 33. The grooves or channels 22 which define the outer set of ball raceways are of a size to provide a slight clearance between the outer surfaces of the balls 33 and the wall surfaces of the channels 22 and the outer surface of the divider sleeve 23, whereby the balls which occupy the outer set of raceways are retained against lateral or radial displacement to any great extent, but are free to roll and slide within the channels 22. Also, by reference to FIG. 3, it will be seen that the width of the individual separator segments 29, which define the inner set of ball-receiving raceways, is slightly less than the diameter of the ball elements 33 and is such as to permit a spherical segment of each ball element to project radially inwardly beyond the inner surfaces of the segments 29 for rolling contact with the outer surfaces of the pin or post 18. At the same time, the arcuately curved side walls of the segments 29 are disposed in relatively closely spaced relation to the outer surfaces of the balls, and extend radially inwardly a distance sufficient to retain the balls between adjacent segments and to prevent the balls from falling radially inwardly of the post-receiving bore of the assembly upon removal of the pin or post 18 therefrom.

Also, the diameter of the ball elements 33 is preferably slightly greater than the width of the annular space measured between the outer surface of the pin or post 18 and the inner wall surface of the inner divider sleeve 23, whereby upon insertion of the pin or post 18 within the axial passage of the bearing assembly 15, the ball elements 33 comprising the inner sets or rows of balls will be "preloaded," or, in other words, placed under slight compressive force, to thus insure accurate guided movement of the pin or post 18 during relative axial reciprocation thereof within the bearing assembly by eliminating any lateral or radial movement of the post 18 within the bearing assembly. Toward this end, the inner divider sleeve 23, as well as the pin or post 18, are preferably formed of relatively hardened steel to prevent undesired tracking of the surfaces of these elements in contact with the ball elements 33.

As will be seen by reference to FIGS. 1 and 2, the radially disposed cross-over passages 28 formed in each of the end caps 25 establish ball-transferring communication between the upper and lower ends of each set of radially aligned inner and outer ball-receiving raceways, and permit free exchange or circulation of ball elements between the inner and outer sets of raceways. In this regard, it will be understood that due to the preloaded condition of the ball elements 33 which occupy the inner raceways 30, such ball elements, upon axial movement of the pin or post 18, are caused to roll longitudinally or axially within the raceways at a rate of linear movement equal to one-half the distance of axial travel of the pin or post 18. Thus, assuming that the pin or post 18 moves downwardly, as viewed in FIG. 1, the ball elements 33 occupying the inner set of raceways will accordingly move downwardly within the raceways until they reach the cross-over passages 28 of the lower end cap, at which time, the balls will move radially outwardly through the passages 28 and then upwardly into the outer or return raceways 22. Also, due to the fact that the raceways are substantially filled with ball elements, the forced movement of the balls occupying the inner set of raceways will cause corresponding movement of the balls of the outer raceways, and will thus produce a constant circulation or recirculation of balls between the inner and outer sets of raceways. This, effectively, distributes normal wear over a sizeable quantity or number of ball elements, thus substantially increasing the operational life of the ball elements. At the same time, by radially offsetting the outer or return sets of raceways 22 from the active or inner sets of raceways 30, the inner rows of balls may be relatively closely spaced to one another so as to provide a maximum number of balls in contact with the associated axially movable member at all times.

FIGS. 5 through 8 of the drawings disclose a modified form of bearing assembly embodying the features of the present invention. In this latter construction the outer sleeve-like casing 20a and the inner divider sleeve 23a are identical to the arrangement and construction of the bearing assembly disclosed in FIGS. 1 through 4, but instead of arranging the inner sets of ball-receiving raceways 30a in exact radial alignment with the outer sets of raceways or channels 22a, the inner raceways and inner rows of balls are disposed in angular, or circumferentially staggered relation to the outer set of raceways, as more particularly shown by comparison of FIGS. 3 and 6 of the drawings. To accomplish this circumferentially staggered relationship between the inner rows of balls and the outer rows of balls, the positions of the separator segments 29a are simply shifted angularly so as to position the separator segments in radial alignment with the outer raceway-forming channels 22a of the outer casing 20a. At the same time, this circumferential staggering of the inner and outer rows of balls necessitates a modification to the end cap members 25a to the extent that the arcuate cross-over passages or grooves 28a must now be disposed in acutely angular relationship to a plane passing longitudinally and diametrically through the axis of the bearing assembly. This relative acutely angular relationship of the crossover passages or grooves 28a is illustrated more particularly in FIG. 7 which is a view looking downwardly, in top plan, upon the inner surface of the lower end cap 25a. Also, depending upon whether the opposite upper and lower end caps, 25b and 25a, respectively, have their cross-over grooves or passages formed in identical pattern, or in opposite angularity, the ball elements 33 may be caused either to circulate first from one inner raceway to one outer raceway and thence to a different inner raceway, or merely to circulate between only one inner and one outer raceway. In the modified form of the present invention as disclosed in FIGS. 5 through 8, the end caps 25a and 25b are of identical construction and thus provide for a continuous serpentine circulation or orbiting of the individual balls between different ones of the inner and outer sets of raceways. However, it will be understood that simply by reversing the angularity of the cross-over grooves or passageways, as between the respective end caps 25a and 25b, the balls will be confined in their circulation or orbiting as between individual or separate pairs of inner and outer raceways.

Figure 8:
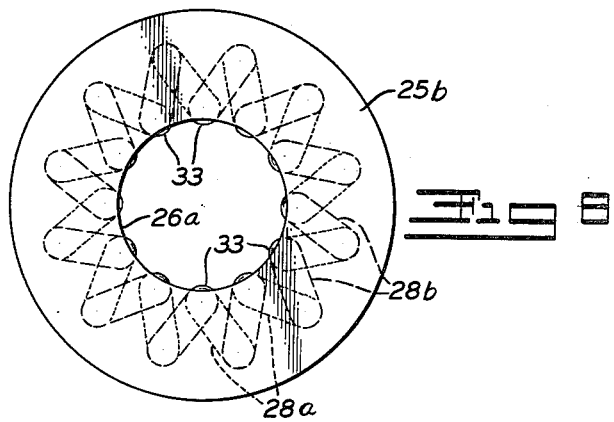
FIG. 8 is a top plan view of the bearing assembly shown in FIG. 5.

The aforesaid serpentine circulation or orbiting movement of the balls within the bearing assembly is illustrated more particularly by reference to FIG. 8 of the drawings, wherein it will be seen that the cross-over passages or grooves 28a formed in the lower end cap 25a, and as indicated by dotted lines, extend in one acutely angular direction relative to a line drawn radially through the center of the bearing assembly, while the cross-over passages or grooves 28b formed in the upper end cap 25b, and as illustrated in dash lines, extend in opposite acutely angular relation to a line drawn radially through the center of the bearing assembly. Thus, the upper end of each of the inner raceways connects with the upper end of one of the outer raceways, while the lower end of such inner raceway connects with the lower end of another of the outer raceways. Consequently, depending upon the length of movement of an associated shaft or post, not shown in FIGS. 5-8, the individual balls are caused to circulate or orbit in a radially staggered, serpentine pattern circumferentially within the bearing assembly. Here, again, this pattern of circulation tends to insure uniform normal wear upon the ball elements and a consequent extended operational life of the bearing assembly. Further, by reason of the relative circumferential staggering of the balls of the inner raceways relative to the balls of the outer raceways, the inner or active rows of balls, which are normally preloaded between the outer surface of an associated shaft and the inner surface of the inner divider sleeve 23a, are disposed in radial alignment with the relatively thicker portions of the outer sleeve-like casing 20a, which thus functions to greatly strengthen and reinforce the inner divider sleeve 23a in the regions thereof contacted by the inner rows of balls.

Figure 9:
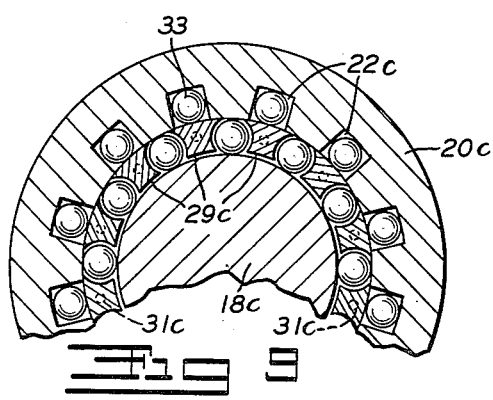
FIG. 9 is a fragmentary horizontal sectional view, similar to FIGS. 3 and 6, but illustrating a further modified form of bearing assembly according to the present invention.

Referring now to FIG. 9 of the drawings, there is disclosed still another modified construction of bearing assembly formed in accordance with the present invention. As in the previously described bearing assemblies, the FIG. 9 construction comprises an outer sleeve-like casing 20c formed on its inner surface with the multiplicity of axially extending and circumferentially spaced grooves or channels 22c which form the outer set of ball-receiving raceways, and which are substantially filled with the spherical ball elements 33. However, in this latter construction, the inner divider sleeve 23 as shown in the previously described bearing assemblies, is eliminated, and in lieu thereof, a multiplicity of relatively widened separator segments 29c are positioned adjacent the inner wall of the outer casing 20c in radial alignment with the open sides of the channels 22c, and in such positions, serve to close the normally open sides of such channels and retain the ball elements 33 within the outer raceways. The separator segments 29c may, if desired, be located and held in association with the opposite end caps, as previously described, or may, if desired, be welded or interconnected, as by means of dovetail slot connections, with the inner wall portion of the outer casing 20c. As shown in FIG. 9, the separator segments 29c are provided with the end extensions 31c which are adapted to be retained within the respective end caps of the assembly, in the manner shown in FIG. 4 of the drawings. It will be understood that the bearing construction disclosed in FIG. 9 will employ and embody in its assembly a pair of co-operative end cap members similar to those employed in connection with the species of the present invention as disclosed in FIGS. 6 through 8, and wherein such end caps are provided with appropriate, angularly disposed cross-over passages or grooves permitting transfer of balls from the inner sets of raceways to the outer sets of raceways.

In the construction shown in FIG. 9, the individual separator segments 29c are formed with arcuately curved side surfaces which extend sufficiently around the ball elements 33 to retain the same against radial inward displacement upon withdrawal of the associated shaft or post member 18c. Also, the radial thickness of the segments 29c is slightly less than the diameter of the ball elements 33 so as to permit spherical segments of each of the ball elements 33 which are disposed within the inner raceways to project radially inwardly for rolling contact with the outer surface of the shaft or post 18c. Preferably, as previously described in connection with the species of the present invention as disclosed in FIGS. 1 through 8, the ball elements 33 of the FIG. 9 construction are preloaded between the outer surface of the shaft or post 18c and the inner wall surface of the outer casing 20c to insure positive rolling movement of the ball elements of the inner races upon axial movement of the associated post or shaft 18c. It should be further understood that in the construction of FIG. 9, it is desirable that the outer casing 20c be heat treated folling the formation of the grooves or channels 22c in order to provide a relatively hardened inner surface upon the casing 20c capable of withstanding the preloaded forces exerted thereon by the ball elements 33 without undesired tracking of the inner surfaces of the outer casing.

In view of the foregoing, it will be seen that the present invention provides an improved tubular-type antifriction bearing assembly for axially or linearly movable shafts or the like which is characterized by a circulating or orbiting system of ball bearings so arranged as to cause a constant circulation or exchange of ball elements between relatively active and inactive positions with respect to the member movably supported by the bearing assembly. At the same time, the present bearing constructions are particularly adapted for application to installations requiring preloading of the ball members in contact with the supported member. Additionally, bearing assemblies formed in accordance with the present invention are characterized by their rugged and durable construction and their ability to distribute normal wear uniformly over a substantially large number of ball elements, thereby greatly increasing the longevity of the bearing assemblies.

While certain preferred embodiments of the present invention have been shown and described in detail, it will be understood that various modifications as to design and details of construction may be resorted to without departing from the spirit of the invention or the scope of the following claims.

Having thus described this invention, what is claimed is:

1. An antifriction bearing assembly for an axially movable member comprising an outer tubular sleeve of annular cross section formed with a plurality of longitudinally extending, circumferentially spaced passages defining a first set of circumferentially separated, ball-receiving raceways; a plurality of relatively circumferentially spaced, longitudinally extending and parallel separator segments disposed radially inwardly of said outer sleeve and forming a second set of circumferentially separated, longitudinally extending, ball-receiving raceways disposed radially inwardly from said first set of raceways, said separator segments defining in said sleeve a circumferentially interrupted cylindrical bore for the reception of an associated axially movable member, and each of said second set of raceways opening radially inwardly of said bore; a multiplicity of spherical balls substantially filling each of said first and second sets of raceways, the balls occupying said second set of raceways each having spherical segments thereof projecting radially inwardly of said bore for rolling engagement with an axially movable member positioned in said bore; and end members positioned at and connected with the opposite ends of said sleeve for holding said separator segments in their aforesaid positions within said sleeve, each end member being formed with a plurality of circumferentially spaced grooves defining ball cross-over passages between said first and second sets of raceways, each of the grooves of the respective end members being arranged to connect one raceway of said first set of raceways with one raceway of said second set of raceways to thereby provide for the transfer of balls from one of said sets of raceways to the other.

2. An antifriction bearing assembly as defined in claim 1, wherein said first set of raceways are disposed in radial alignment with said second set of raceways and the grooves of said end members are disposed radially of said sleeve.

3. An antifriction bearing assembly as defined in claim 1, wherein said first set of raceways are disposed in radially spaced, but circumferentially staggered relation to said second set of raceways and the grooves of said end members are disposed in acutely angular relation to a plane passing diametrically and longitudinally through said sleeve.

4. An antifriction bearing assembly as defined in claim 3, wherein the grooves of one end member, respectively, connect one of the raceways of said first set of raceways with one of the raceways of said second set of raceways, and the grooves of the other end member, respectively, connect the same raceways of said first set of raceways with a different raceway of said second set of raceways.

5. An antifriction bearing assembly for an axially movable shaft comprising a tubular outer casing having a cylindrical inner wall surface formed with a plurality of relatively circumferentially spaced, longitudinally extending and parallel channels defining a first set of circumferentially separated, ball-receiving raceways; means including a plurality of individual, relatively circumferentially spaced, longitudinally extending and parallel separator segments positioned radially inwardly of said casing and defining a second set of ball-receiving raceways, said separator segments defining in said outer casing a circumferentially interrupted, axial passage for the reception of an axially movable shaft, the circumferential spacing between said separator segments forming a plurality of longitudinally extending, parallel and relatively restricted slots between said second set of raceways and the axial shaft-receiving passage; a multiplicity of spherical balls substantially filling each of said first and second sets of raceways, the balls occupying said second set of raceways each having a spherical segment thereof projecting radially inwardly through said restricted slots and into said shaft-receiving passage for rolling engagement with an axially movable shaft positioned in said passage; and a pair of annular end caps secured respectively to the opposite ends of said outer casing and engaging each of said separator segments at the ends thereof for maintaining said separator segments in their aforesaid circumferentially spaced relation, each of said end caps being formed with a plurality of circumferentially spaced grooves providing a plurality of separate cross-over passages between said first and second sets of raceways, each of said grooves being arranged to connect one raceway of said first set of raceways with one raceway of said second set of raceways to thereby provide for the transfer of balls from one set of raceways to the other.

References Cited in the file of this patent

UNITED STATES PATENTS

| | | |
|---|---|---|
| 2,451,359 | Schlicksupp | Oct. 12, 1948 |
| 2,576,269 | Thomson | Nov. 27, 1951 |

FOREIGN PATENTS

| | | |
|---|---|---|
| 755,957 | France | Dec. 2, 1933 |
| 679,843 | Great Britain | Sept. 24, 1952 |